United States Patent
Link

(10) Patent No.: US 6,264,239 B1
(45) Date of Patent: Jul. 24, 2001

(54) STEERING COLUMN ARRANGEMENT FOR A MOTOR VEHICLE

(75) Inventor: Manfred Link, Waiblingen (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/272,375

(22) Filed: Mar. 19, 1999

(30) Foreign Application Priority Data

Mar. 19, 1998 (DE) ............................................. 198 12 179

(51) Int. Cl.⁷ ...................................................... B62D 1/19
(52) U.S. Cl. ......................... 280/777; 280/775; 280/779; 74/492
(58) Field of Search .................................... 280/777, 775, 280/779; 74/492, 493; 180/400, 427, 428, 444, 434

(56) References Cited

U.S. PATENT DOCUMENTS

| | | |
|---|---|---|
| 3,813,961 | 6/1974 | Hug . |
| 4,228,695 * | 10/1980 | Trevisson et al. .................... 280/777 |
| 4,862,761 * | 9/1989 | Sander et al. ......................... 280/777 |
| 5,141,248 | 8/1992 | Haldric et al. . |
| 5,178,411 * | 1/1993 | Fevre et al. ........................... 280/775 |
| 5,209,135 * | 5/1993 | Ichikawa ............................... 280/777 |
| 5,634,662 * | 6/1997 | Asayama ............................... 280/777 |
| 5,690,362 * | 11/1997 | Peitsmeier et al. ................... 280/775 |
| 5,806,890 * | 9/1998 | Sugiki et al. ......................... 280/775 |

FOREIGN PATENT DOCUMENTS 195 24 196
C1    11/1996 (DE) .

* cited by examiner

*Primary Examiner*—Michael Mar
*Assistant Examiner*—Hau Phan
(74) *Attorney, Agent, or Firm*—Crowell & Moring, L.L.P.

(57) ABSTRACT

A steering column arrangement has an interior steering column tube which can be axially and telescopically adjusted by a spindle drive relative to an exterior steering column tube. A threaded spindle of the spindle drive is disposed by way of energy-absorbing bearing blocks. The longitudinally extending adjusting member is provided with a desired buckling point. At the level of the desired buckling point, a supporting bow is provided which is stationarily arranged on the exterior steering column tube, reaches at least partially over the desired buckling point and is designed to be plastically deformable.

8 Claims, 2 Drawing Sheets

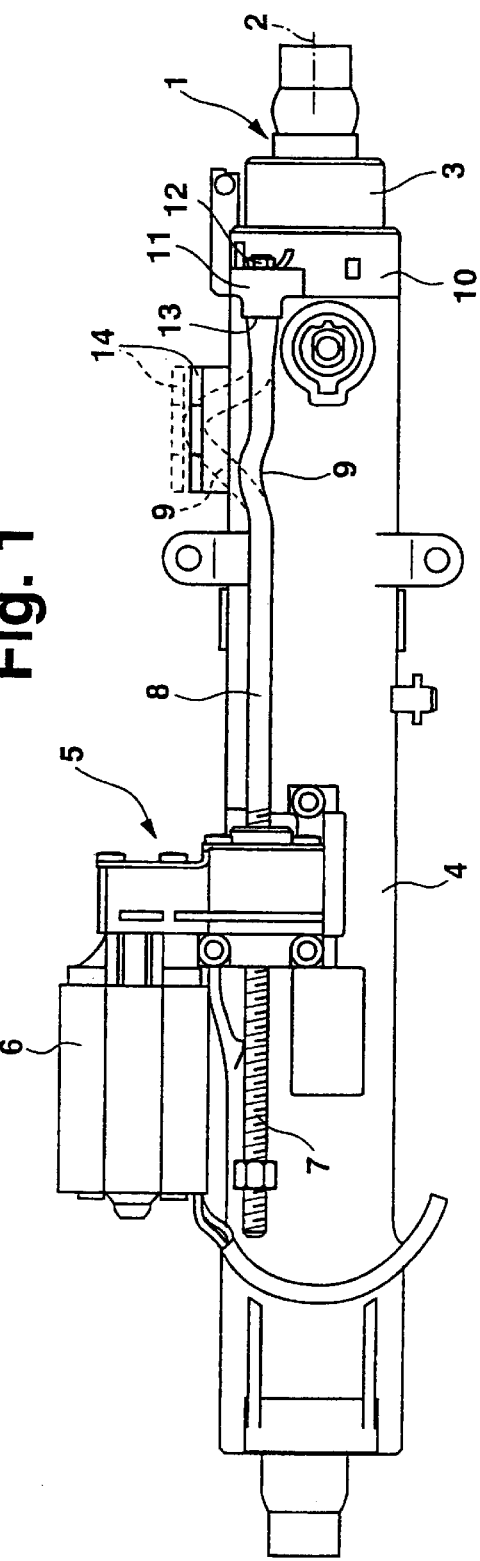
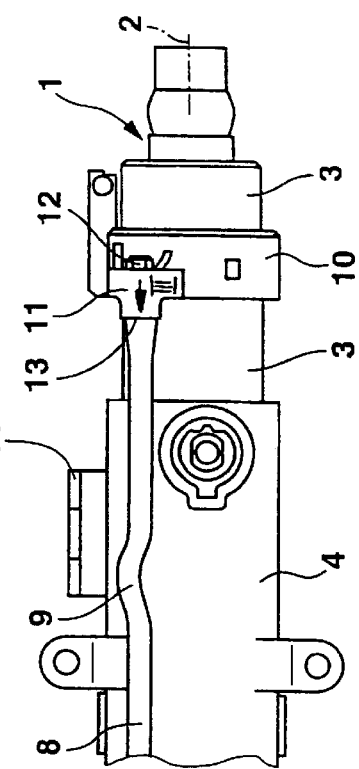
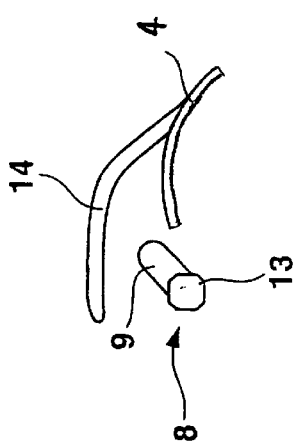

STEERING COLUMN ARRANGEMENT FOR A MOTOR VEHICLE

CROSS-REFERENCE TO RELATED APPLICATION (47607)

This application is related to application Ser. No. 09/272,374 filed on Mar. 9, 1999, entitled MOTOR VEHICLE STEERING COLUMN ARRANGEMENT WITH SPACE-SAVING HOLDER FOR ADJUSTMENT, and filed in the name of Manfred Link.

BACKGROUND OF THE INVENTION

This application claims the priority of 198 12 179.2-21, filed Mar. 19, 1998, the disclosure of which is expressly incorporated by reference herein.

The present invention relates to a steering column arrangement for a motor vehicle, having an exterior, stationarily arranged steering column tube as well as having an interior steering column tube which is telescopically displaceable in the exterior steering column tube. An adjusting device is operative between the two steering column tubes for displacing the interior steering column tube inside the exterior steering column tube, and has an adjusting member which is stationarily applied to the interior steering column tube, extends longitudinally and is aligned axially in parallel with the steering axis. Energy absorption devices are assigned to the adjusting member.

A steering column arrangement is described in DE 195 24 196 C1. This known steering column arrangement has a steering spindle which carries a steering wheel and which is rotatably disposed in an interior steering column tube. The interior steering column tube is telescopically displaceably disposed in an exterior steering column tube. The exterior steering column tube is fixed to the vehicle body supporting structure of the motor vehicle.

For displacing the interior steering column tube with respect to the exterior steering column tube, an adjusting arrangement is configured as a spindle drive operated by an electric motor. The spindle drive has an adjusting spindle which extends axially in parallel to the steering axis of the steering spindle on the outside along the exterior and the interior steering column tube and is fixed by a holding device on a frontal end stationarily to the interior steering column tube. In the area of the exterior steering column tube, a threaded nut is disposed on the adjusting spindle configured as a threaded spindle and is disposed between two energy-absorbing bearing blocks. By way of a corresponding gearbox, the electric servo motor acts upon the threaded nut.

In the event of an impact load onto the motor vehicle, additional impact energy can be absorbed in the area of the adjusting arrangement in the known arrangement by plastically deforming the energy-absorbing bearing blocks through the introduction of force by way of the adjusting spindle. Depending on the direction of the impact load, i.e., from the steering gear or from the vehicle interior and therefore from the steering wheel, tension and pressure loads therefore act upon the adjusting spindle which can be reduced by way of the energy-absorbing bearing blocks while absorbing energy.

SUMMARY OF THE INVENTION

An object of the present invention is to provide a steering column arrangement which can absorb impact energy by using simple devices during a vehicle impact.

This object has been achieved in that a longitudinally extending adjusting member is provided with a desired buckling point. At the level of the desired buckling point, a supporting bow is provided which is stationarily arranged on the interior steering column tube, reaches at least partially over the desired buckling point and has a plastically deformable configuration. As a result, in the area of the adjusting arrangement, impact energy is reduced by a deformation of the adjusting member which, on the one hand, is arranged on the interior steering column tube and, on the other hand, is arranged on the exterior steering column tube.

Because of the characteristic that an additionally plastically deformable supporting bow reaches at least partially over the adjusting member in the area of the desired buckling point, this supporting bow is additionally deformed during a deformation of the adjusting member in the area of the desired buckling point as soon as, during the deformation, the desired buckling point comes to rest against this supporting bow. A series-type connection is therefore obtained of the energy absorption devices in the form of the desired buckling point and of the supporting bow. Particularly a threaded spindle of a spindle drive is provided as the adjusting member.

As an alternative, however, another adjusting member in the form of a tension-compression rod can also be provided which is acted upon by hydraulic or pneumatic, hydraulic or electric driving members.

The solution according to the invention allows a reduction of impact energy to first take place by a deformation of the adjusting member in the area of the desired buckling point. The contact of the desired buckling point on the supporting bow is adapted such to the deformation path that the contact already takes place after a slight drop of the deformation force level. As the result of the contact and the subsequent additional deformation of the supporting bow, a force rise of the deformation force level again takes place so that impact energy continues to be convertible. The deformation force level can therefore be kept high along a considerably longer displacement path between the interior and the exterior steering column tube than would be the case if only a desired buckling point were provided.

As a further feature of the invention, the desired buckling point of the adjusting member is aligned at an angle to the supporting bow such that, during a buckling operation, the desired buckling point is steered toward an application point of the supporting bow on the steering column tube. As a result, the desired buckling point is prevented from sliding off on the supporting bow to the outside, whereby the supporting bow could no longer exercise a supporting function of the desired buckling point.

BRIEF DESCRIPTION OF THE DRAWINGS

Other objects, advantages and novel features of the present invention will become apparent from the following detailed description of the invention when considered in conjunction with the accompanying drawings.

FIG. 1 is a side view of an embodiment of a steering column arrangement for a passenger car according to the present invention, an adjusting arrangement between the two steering column tubes in a crash position being shown by a dashed line;

FIG. 2 is a view of a cutout portion of the steering column arrangement shown in FIG. 1 in a normal operating position of the adjusting arrangement;

FIG. 3 is a schematic view in the direction of the arrow III in FIG. 2 of the alignment of a desired buckling point of an adjusting spindle of the adjusting arrangement with respect to a supporting bow in the unloaded, inoperative position;

DETAILED DESCRIPTION OF THE DRAWINGS

Figure 4:
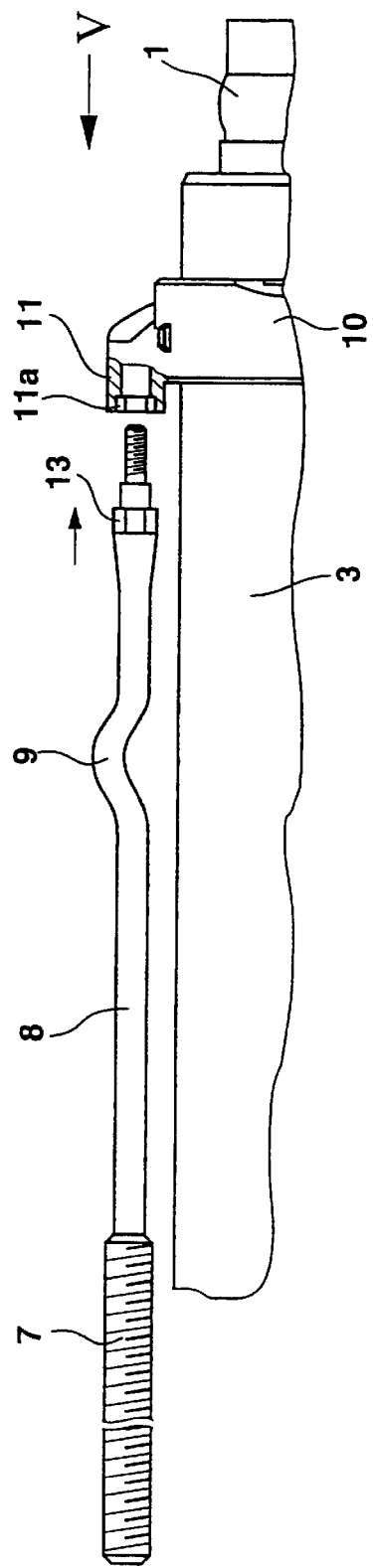
FIG. 4 is a view of the stationary positioning of the adjusting spindle shown in FIGS. 1 to 3 on a holder of the interior steering column tube of the steering column arrangement of FIGS. 1 and 2.

A steering column arrangement according to FIGS. 1 to 5 is part of a steering system of a passenger car. The steering column arrangement has a steering spindle 1 which is disposed to be rotatable about a steering axis in an interior steering column tube 3. A front end of the steering spindle 1, which is on the right side in FIG. 1, is used for receiving a steering wheel. The interior steering column tube 3 is telescopically longitudinally slidably disposed coaxially in an exterior steering column tube 4. In a manner generally known per se, the exterior steering column tube 4 is stationarily connected with a vehicle body supporting structure of the passenger car in a center console area or front wall area.

In order to be able to axially displace the interior steering column tube 3 relative to the exterior stationary steering column tube 4 telescopically along the steering axis 2, an adjusting arrangement in the form of a spindle drive 5 is provided. The spindle drive has an adjusting spindle 7, 8, 9 which extends axially in parallel to the steering axis 2 and is fixed a forward front end in a torsionally secured manner in a holding device 11 of a ring-shaped support collar 10 which is axially and non-rotatably fixed on the outer jacket of the interior steering column tube 3. For the torsionally secure fixing of the adjusting spindle 7, 8, 9 in the holding device 11, the associated front end of the adjusting spindle 7, 8, 9 is equipped with a square or other satisfactory profile 13 which can be fitted in a torsionally secured manner in a corresponding square or the like receiving profiling 11a of the holding device 11 as viewed in the direction of the arrow in FIG. 4). The front end of the adjusting spindle 7, 8, 9 carrying the square profile 13 is fixed by a fastening nut 12 and a corresponding external thread section of this front end axially in the holding device 11.

Spaced from the front end having the square profile 13, the adjusting spindle 7, 8, 9 has an external thread 7 which is engaged with a threaded nut of the adjusting arrangement 5 rotatably disposed in a housing. The threaded nut is disposed in a stable manner so that it cannot escape in the axial direction. The threaded nut has an external toothing and can be rotated by an electric servo motor 6 by way of a corresponding gearbox. A rotation of the threaded nut causes an axial adjustment of the adjusting spindle 7, 8, 9. The basic operating principle of the spindle drive corresponds to the known spindle drive described in the above-referenced DE 195 24 196 C1, so that a further detailed explanation is not required.

Between the external thread 7 and the front end of the adjusting spindle having the square profile 13, a tension-compression rod section 8 of the adjusting spindle 7, 8, 9 has a desired buckling point 9 which is implemented by a curved bending of the tension-compression rod section 8. A curved profiled supporting bow 14 reaches without contact over the desired buckling point 9, adjoins the jacket of the exterior steering column tube 4 and is rigidly connected therewith. The supporting bow 14 has a freely projecting, forward front end which reaches in a spaced manner without contact over the adjusting spindle (as best seen in FIG. 3), as long as no buckling operation is occurring. The width of the supporting bow 14 shown in FIGS. 1 and 2 corresponds to the length of the maximal adjusting path of the interior steering column tube 3 relative to the exterior steering column tube 4 so that the supporting bow 14 reaches over the desired buckling point 9 independently of the respective adjusting position of the interior steering column tube 3 relative to the exterior steering column tube 4.

As illustrated particularly in FIG. 3, the adjusting spindle 7, 8, 9 with the desired buckling point 9 in the mounted condition is aligned with respect to the supporting bow 14 such that, during a buckling operation because of an axial load onto the steering column arrangement shown in FIG. 1 after the contact on the interior side of the supporting bow 14, it slides off to the adjoining point of the supporting bow 14 (to the right in FIG. 3) and thus, during the entire deforming operation, remains caught by the supporting bow 14 and, while the supporting bow 14 is deformed, remains supported thereby.

Figure 6:
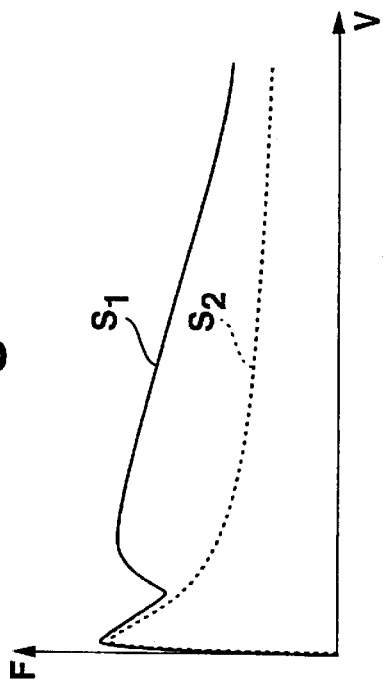
FIG. 6 is a force-path diagram for illustrating the deformation force course of the adjusting member and of the supporting bow by way of the displacement path of the interior steering column tube relative to the exterior steering column tube.
Figure 5:
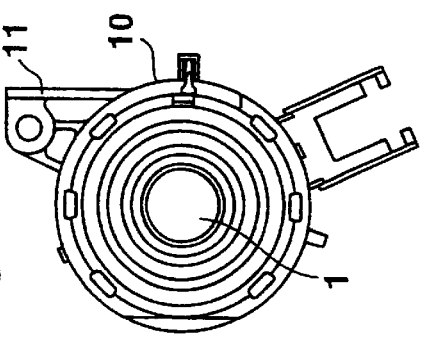
FIG. 5 is a front view of the steering column arrangement shown in FIG. 1 or 4 as viewed in the direction of the arrow V in FIG. 4.

Because of a vehicle impact onto the steering column tube 3, 4, as soon as now an axial load is applied in one or the other direction (depending on an introduction of impact energy into the steering wheel or into a steering gear in the front axle area), the steering column tube 3 experiences a displacement relative to the exterior steering column tube 4. Because of the self-inhibiting configuration of the spindle drive, the adjusting spindle 7, 8, 9 presents a resistance to this axial displacement which, because of extent of the impact load, results in a buckling of the desired buckling point 9. The deformation force F first rises until the buckling of the desired buckling point 9 as seen in FIG. 6, relative to the displacement path V of the interior steering column tube 3 relative to the exterior steering column tube 4, and falls again after the buckling.

Because the falling of the deformation force level simultaneously also permits only a reduced energy absorption, the supporting bow 14 is additionally provided which, after the contact of the desired buckling point 9 because of the buckling operation on its interior side also deforms plastically (i.e., the bending-open path, as illustrated in FIG. 1 by dashed lines). After the desired buckling point 9 meets the supporting bow 14, according to the deformation force curve $S_1$ of FIG. 6, there is a new rise of force, in which case the deformation force level remains at a higher level (force-path course $S_2$) with respect to the buckling operation without an additional supporting bow.

As a result of the additional plastic deformation of the supporting bow 14, which is triggered by the abutting of the desired buckling point 9, a considerably higher absorption of impact energy can therefore be achieved than would be the case with an energy absorption device formed only by the desired buckling point 9. Thus, with respect to the energy absorption effect in the case of a vehicle impact, the desired buckling point 9 is connected in series with the supporting bow 14 in that first the desired buckling point 9 and then the supporting bow 14 are plastically deformed while correspondingly absorbing energy.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A steering column arrangement for a motor vehicle, comprising an exterior, stationarily arranged steering column tube, an interior steering column tube telescopically displaceable in the exterior steering column tube, and an adjusting device operatively arranged between the two steering column tubes for displacing the interior steering column tube inside the exterior steering column tube, the adjusting device having an adjusting member which is stationarily applied to the interior steering column tube, extends longitudinally thereof and is aligned axially parallel with a steering axis, and the longitudinally extending adjusting member is configured with a desired buckling point for producing a laterally projecting deformation portion during longitudinal compression of the longitudinally extending adjusting member, and at a level of the desired buckling point, a supporting bow is stationarily arranged on the exterior steering column tube, reaches at least partially over the desired buckling point and is plastically deformable upon engagement of the buckling point with the supporting bow during a forced telescopic collapse of the interior steering column relative to the exterior steering column tube.

2. The steering column arrangement according to claim 1, wherein supporting bow adjoins a jacket of the exterior steering column tube and curved over the desired buckling point.

3. The steering column arrangement according to claim 1, wherein the desired buckling point of the adjusting member is aligned at an angle to the supporting bow such that, during a buckling operation, the desired buckling point is steered to an adjoining point of the supporting bow on the steering column tube.

4. The steering column arrangement according to claim 3, wherein supporting bow adjoins a jacket of the exterior steering column tube and curved over the desired buckling point.

5. The steering column arrangement according to claim 1, wherein the adjusting member is a threaded spindle of a spindle drive.

6. The steering column arrangement according to claim 5, wherein supporting bow adjoins a jacket of the exterior steering column tube and curved over the desired buckling point.

7. The steering column arrangement according to claim 6, wherein the desired buckling point of the adjusting member is aligned at an angle to the supporting bow such that, during a buckling operation, the desired buckling point is steered to an adjoining point of the supporting bow on the steering column tube.

8. The steering column arrangement according to claim 5, wherein the desired buckling point of the adjusting member is aligned at an angle to the supporting bow such that, during a buckling operation, the desired buckling point is steered to an adjoining point of the supporting bow on the steering column tube.

* * * * *